US012530404B1

(12) United States Patent
Merritt

(10) Patent No.: US 12,530,404 B1
(45) Date of Patent: Jan. 20, 2026

(54) SYSTEMS, DEVICES, AND METHODS FOR PARALLELIZED DATA STRUCTURE PROCESSING

(71) Applicant: MASSACHUSETTS MUTUAL LIFE INSURANCE COMPANY, Springfield, MA (US)

(72) Inventor: Sears Merritt, Groton, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 112 days.

(21) Appl. No.: 17/684,166

(22) Filed: Mar. 1, 2022

Related U.S. Application Data

(63) Continuation of application No. 15/937,573, filed on Mar. 27, 2018, now Pat. No. 11,263,275.

(60) Provisional application No. 62/480,927, filed on Apr. 3, 2017.

(51) Int. Cl.
*G06F 16/00* (2019.01)
*G06F 16/901* (2019.01)
*G06F 16/951* (2019.01)
*G06N 20/00* (2019.01)
*H04L 9/40* (2022.01)
*H04L 67/2895* (2022.01)
*H04L 67/306* (2022.01)
*H04L 67/56* (2022.01)
*H04L 67/01* (2022.01)

(52) U.S. Cl.
CPC ........ *G06F 16/9027* (2019.01); *G06F 16/951* (2019.01); *G06N 20/00* (2019.01); *H04L 63/0428* (2013.01); *H04L 67/2895* (2013.01); *H04L 67/306* (2013.01); *H04L 67/56* (2022.05); *H04L 67/01* (2022.05)

(58) Field of Classification Search
CPC .......................... G06F 16/9027; G06F 16/951
See application file for complete search history.

(56) References Cited

U.S. PATENT DOCUMENTS

| | | | |
|---|---|---|---|
| 6,110,109 A | 8/2000 | Hu et al. | |
| 8,037,043 B2 | 10/2011 | Zoeter et al. | |
| 8,694,540 B1 * | 4/2014 | Lin ....................... | G06F 16/211 707/777 |
| 8,972,400 B1 | 3/2015 | Kapczynski et al. | |
| 9,892,462 B1 | 2/2018 | Ross et al. | |
| 10,096,068 B1 | 10/2018 | Ross et al. | |
| 10,360,517 B2 | 7/2019 | Koch et al. | |
| 10,366,412 B1 | 7/2019 | Ross et al. | |
| 10,402,908 B1 | 9/2019 | Ross et al. | |
| 10,489,861 B1 | 11/2019 | Ross et al. | |
| 10,542,148 B1 | 1/2020 | Merritt | |
| 10,592,554 B1 | 3/2020 | Merritt | |
| 10,846,434 B1 | 11/2020 | Ben-Zvi et al. | |
| 10,847,266 B1 | 11/2020 | Ross et al. | |

(Continued)

OTHER PUBLICATIONS

Bergstra et al., "Random Search for Hyper-Parameter Optimization", Abstract only, Journal of Machine Learning Research, 2012, pp. 1-1 (1 page).

(Continued)

*Primary Examiner* — Khanh B Pham
(74) *Attorney, Agent, or Firm* — Foley & Lardner LLP

(57) ABSTRACT

This disclosure discloses systems, devices, and methods for parallelized data structure processing in context of machine learning and reverse proxy servers.

13 Claims, 4 Drawing Sheets

(56) References Cited

U.S. PATENT DOCUMENTS

| | | |
|---|---|---|
| 11,436,281 B1 | 9/2022 | Merritt |
| 11,853,360 B1 | 12/2023 | Merritt |
| 2009/0164450 A1 | 6/2009 | Martinez et al. |
| 2009/0177644 A1 | 7/2009 | Martinez et al. |
| 2011/0207128 A1 | 8/2011 | Cawthon et al. |
| 2013/0204811 A1 | 8/2013 | Morinaga et al. |
| 2013/0323751 A1 | 12/2013 | Singbartl et al. |
| 2014/0019473 A1 | 1/2014 | Kamenz et al. |
| 2014/0187519 A1 | 7/2014 | Cooke et al. |
| 2014/0350967 A1 | 11/2014 | Geleijnse et al. |
| 2015/0269225 A1 | 9/2015 | Agrawal et al. |
| 2016/0042135 A1 | 2/2016 | Hogan et al. |
| 2016/0107526 A1 | 4/2016 | Jin et al. |
| 2016/0335435 A1 | 11/2016 | Schmidtler et al. |
| 2017/0053283 A1 | 2/2017 | Meng et al. |
| 2017/0055916 A1* | 3/2017 | Bhattacharya ....... A61B 5/7275 |
| 2017/0103179 A1* | 4/2017 | Jiao ..................... G16H 10/20 |
| 2017/0316345 A1 | 11/2017 | Palmer |
| 2018/0152418 A1 | 5/2018 | Tableman |
| 2018/0158552 A1* | 6/2018 | Liu ........................ G06N 3/045 |
| 2018/0240041 A1 | 8/2018 | Koch et al. |
| 2019/0172587 A1* | 6/2019 | Park ...................... G16B 20/00 |
| 2019/0287683 A1* | 9/2019 | Srinivasan ............. G06N 20/00 |
| 2020/0051695 A1 | 2/2020 | Sevenster et al. |
| 2021/0019639 A1* | 1/2021 | Parker .................... G06F 16/22 |
| 2023/0034892 A1* | 2/2023 | Hummel ................ G06Q 40/08 |

OTHER PUBLICATIONS

Thornton, et al., "Auto-WEKA: Combined Selection and Hyperparameter Optimization of Classification Algorithms", Proceedings of the 19th ACM SIGKDD International Conference on Knowledge Discovery and Data Mining, Aug. 11-14, 2013, pp. 847-855 (9 pages).

Yanya, et al., "Using Data Mining Techniques for Predicting Individual Tree Mortality in Tropical Rain Forest: Logistic Regression and Decision Trees Approach", Conference on Ubiquitous Information Management and Communication, Jan. 2014, pp. 1-5 (5 pages).

Ling et al., "Decision Tree with Better Ranking," Department of Computer Science, The University of Western Ontario, Canada N6A 5B7, Proceedings of the Twentieth International Conference on Machine Learning (ICML-2003), pp. 480-487). (Year: 2003).

Mantovani et al., "Hyper-Parameter Tuning of a Decision Tree Induction Algorithm,"2016 5th Brazilian Conference on Intelligent Systems, IEEE Xplore, pp. 37-42). (Year: 2016).

Ali et al., "Random Forests and Decision Trees," International Journal of Computer Science Issues, vol. 9, Issue 5, No. 3, Sep. 2012, pp. 272-278. (Year: 2012).

Igor Kotenko, "Security Analysis of Information Systems Taking Into Account Social Engineering Attacks," 2011 19th International Euromicro Conference on Parallel, Distributed and Network-Based Processing, IEEE Computer Society, pp. 611-618. (Year: 2011).

Mohammad Azad et al., "Multi-Pruning of Decision Trees for Knowledge Representation and Classification," 2015 3rd IAPR Asian Conference on Pattern Recognition, IEEE, pp. 604-608. (Year: 2015).

\* cited by examiner

SYSTEMS, DEVICES, AND METHODS FOR PARALLELIZED DATA STRUCTURE PROCESSING

CROSS-REFERENCE TO RELATED APPLICATIONS

This application is a continuation application of U.S. application Ser. No. 15/937,573, filed Mar. 27, 2018, now U.S. Pat. No. 11,263,275, granted Mar. 1, 2022, which claims a benefit of U.S. Provisional Patent Application 62/480,927, filed on Apr. 3, 2017, which is herein incorporated by reference for all purposes. 15

TECHNICAL FIELD

Generally, this disclosure relates to computing. More particularly, this disclosure relates to data structures.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure may be concerned with. Further, nothing is disclaimed.

A server may serve a network page to a client. The network page may include a set of fields programmed to receive a plurality of inputs from the client, such as a plurality of alphanumeric strings or a plurality of binary values. The network page may be further programmed to submit the inputs to the server, such as when the fields are populated or when triggered via the client. For example, a webserver may serve a webpage to a smartphone, where the webpage is programmed to receive a set of user inputs from the smartphone, such as personal information, address, health information, and others, and upload the user inputs to the webserver.

Upon receiving the inputs from the client, the server may create a user profile based on the inputs and provide an output to the client based on the user profile. However, since some of the inputs may contain incorrect or imprecise information, some of the inputs may need to be verified or validated, such as independently. Therefore, until such verification or validation, the user profile may be classified as not reliable. Such classification may also taint the output in a similar light.

When some of the inputs are determined to contain incorrect or imprecise information and when some of such inputs are amended in the user profile with correct or precise information, then this amendment updates the profile. Consequently, the output may be also be updated to account for the amendment. However, if the output has already been used in various data operations, then the update to the output may entail a repetition of such data operations with the output, as updated. This repetition wastes time and resources, such as computational cycles, memory space, and network bandwidth, especially cumulatively. If the output has not yet been used in various data operations, then a delay in verification or validation of some of the inputs is impractical. Accordingly, there is a desire for a computing technology to address at least one of such challenges.

SUMMARY

This disclosure at least partially addresses at least one of the above challenges. However, this disclosure can prove useful to other technical areas. Therefore, at least some claims should not be construed as necessarily limited to addressing any of the above challenges.

In one embodiment, a method comprises: hosting, by a reverse proxy server, an encrypted session with a client, wherein the encrypted session is associated with a user profile; during the encrypted session: serving, by the reverse proxy server, a page to the client, wherein the page is configured to receive a user input from the client; receiving, by the reverse proxy server, the user input from the client; sending, by the reverse proxy server, the user input to an application server; populating, by the application server, the user profile with the user input; submitting, by the application server, a query based on the user profile with the user input to a database server hosting a database such that the database can be queried for the query; receiving, by the application server, a result for the query from the database server; submitting, by the application server, the result to an application programming interface (API) running on the application server; receiving, by the application server, a feature vector from the API; submitting, by the application server, the feature vector to a model hosted via the application server; receiving, by the application server, a value from the model; associating, by the application server, the user profile with the value; and requesting, by the application server, the reverse proxy server to update the page based on the user profile being associated with the value.

In one embodiment, a system comprises: a reverse proxy server, an application server, and a database server, wherein the application server hosts an application programming interface (API) and a model, wherein the database server is hosts a database, wherein the reverse proxy server is configured to: host an encrypted session with a client, wherein the encrypted session is associated with a user profile; serve a page to the client during the encrypted session, wherein the page is configured to receive a user input from the client; receive the user input from the client during the encrypted session; send the user input to the application server during the encrypted session; wherein during the encrypted session the application server is configured to: populate the user profile with the user input; submit a query based on the user profile with the user input to the database server such that the database can be queried for the query; receive a result for the query from the database server; submit the result to API; receive a feature vector from the API; submit the feature vector to a model; receive a value from the model; associating the user profile with the value; and request the reverse proxy server to update the page based on the user profile being associated with the value.

Additional features and advantages of various embodiments are set forth in a detailed description which follows. Various objectives and other advantages of this disclosure are realized and attained by various structures particularly pointed out in various illustrative embodiments in the detailed description and claims hereof as well as in a set of appended drawings. Note that the detailed description is illustrative and explanatory and is intended to provide further explanation of this disclosure as claimed.

DETAILED DESCRIPTION

This disclosure more fully references to the accompanying drawings, in which various embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys the concepts of this disclosure to those skilled in the relevant art.

As described herein, various disclosed technologies can be implemented via a plurality of computers (servers/clients) utilizing a plurality of data structures/messages. Such implementations include data structure/message generation/formation, storage, retrieval, population, copying, moving, editing, modifying, sorting, searching, sending, receiving, updating, deleting, encrypting, decrypting, de-duplicating, converting, uploading, downloading, or any other local or network-based data structure/message operation associated with a structure/message (data shell) or the data itself (content). For example, the structure/message (shell) can comprise a file, a table, a spreadsheet, an array, a matrix, a linked list, a tree, a string, a quadtree, a stack, a deck, or any other structures of data. The data (content) can contain any alphanumeric, image, acoustic, binary, symbolic, equation, formula, or any other content. Also, note that various disclosed algorithms are some non-limiting examples and other variations are possible.

If any disclosures are incorporated herein by reference and such disclosures conflict in part and/or in whole with this disclosure, then to the extent of conflict, and/or broader disclosure, and/or broader definition of terms, this disclosure controls. If such disclosures conflict in part and/or in whole with one another, then to the extent of conflict, the later-dated disclosure controls. U.S. Pat. No. 6,110,109 is herein fully incorporated by reference for all purposes.

Figure 1:
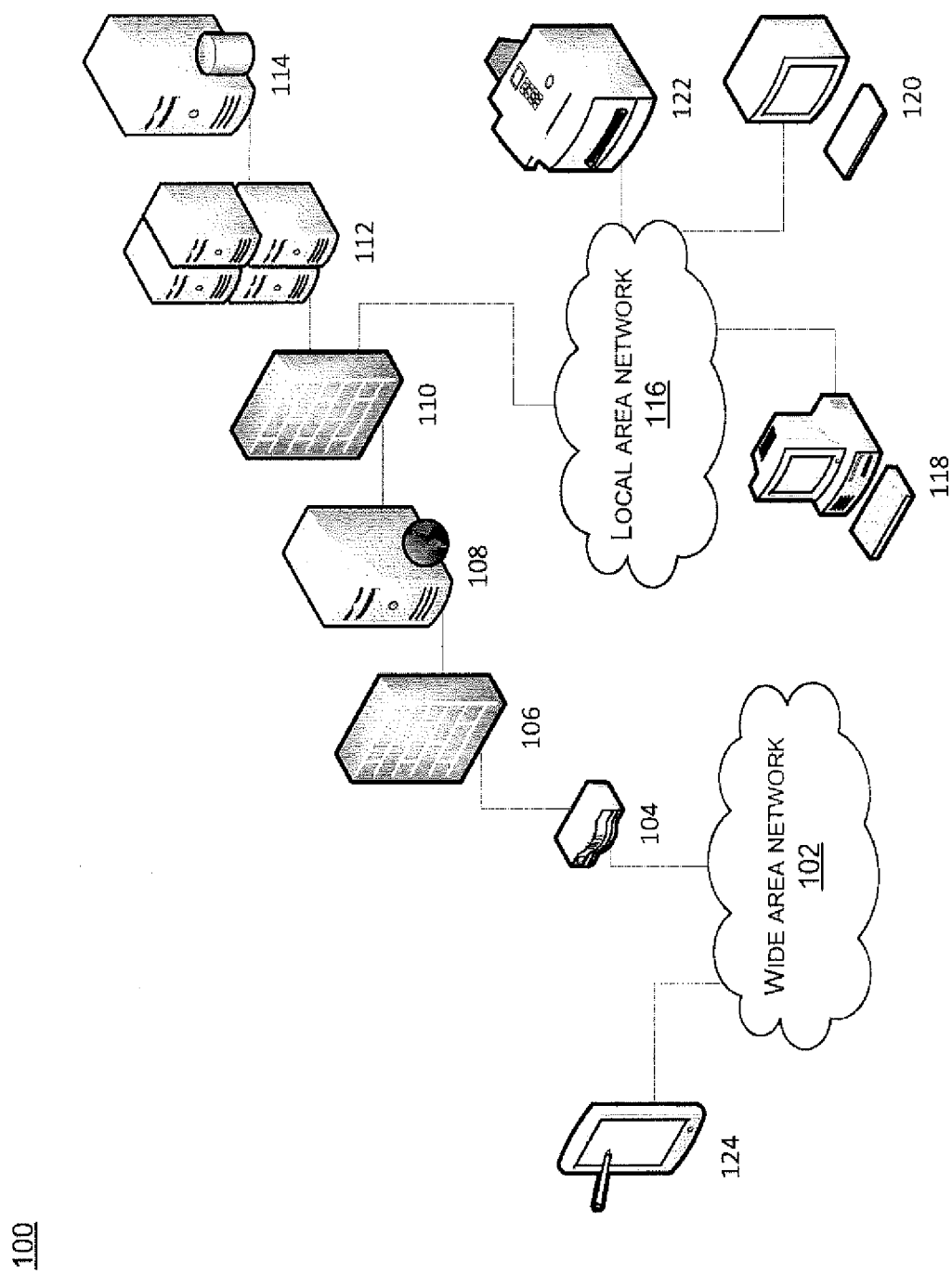
FIG. 1 shows an embodiment of a network topology according to this disclosure.

FIG. 1 shows a schematic view of an embodiment of a network topology according to this disclosure. A network topology 100 comprises a wide area network (WAN) 102 to which a plurality of equipment segments are coupled, whether directly or indirectly, whether in a wired or wireless manner. The segments include a first segment and a second segment.

The first segment is operated via a first operator and the second segment is operated via a second operator. The first segment comprises a router 104, a firewall 106, a network server 108, a firewall 110, an application server 112, a database server 114, a local area network (LAN) 116, a workstation 118, an administrator terminal 120, and a multifunction device 122.

The second segment comprises a client 124 communicably coupled to the WAN 102, whether directly or indirectly, whether in a wired or a wireless manner. The client 124 is operated by an end user, such as a potential or an actual service provider customer. In some embodiments, the first operator and the second operator are a single operator, such as for testing or maintenance of at least one of the first segment or the second segment.

The topology 100 is based on a distributed network operation model, which allocates tasks/workloads between servers, which provide a resource/service, and clients, which request the resource/service. Although 1 the servers and the clients illustrate different computers/applications, in some embodiments, the servers and the clients reside in or share or are one system/application. Further, the topology 100 entails allocating a large number of resources to a small number of servers, where complexity of the clients, depends on how much computation is offloaded to the small number of servers, i.e., more computation offloaded from the clients onto the servers leads to lighter clients, such as being more reliant on network sources and less reliant on local computing resources. However, note that other computing models are possible as well. For example, such models can comprise decentralized computing, such as peer-to-peer (P2P), for instance Bit-Torrent, or distributed computing, such as via a computer cluster where a set of networked computers works together such that the computer can be viewed as a single system.

Each component of the topology 100 can be implemented in a logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component.

The WAN 102 is communicably interposed between the first segment and the second segment. The WAN 102 can be operated via the first operator, the second operator, or a third operator. The WAN 102 can be established via a telecommunication circuit. The WAN 102 can employ circuit switching or packet switching methods. The WAN 102 can employ network protocols including Transmission Control Protocol (TCP)/Internet Protocol (IP), which can be used deliver transport and addressing functions. However, other communication protocols can be used, whether additionally or alternatively, in whole or in part, such as File Transfer Protocol (FTP), Ethernet, Internet Message Access Protocol (IMAP), Internet Control Message Protocol (ICMP), Hypertext Transfer Protocol (HTTP), or others. For example, a communication session between a server and a client can involve at least one of such protocols. The WAN 102 can comprise circuit switched telephone lines, radio wave transmission, or optic fiber. In some embodiments, the first segment and the second segment communicably interface with each other, while avoiding the WAN 102, such via direct communication, such as via the router 104 and the client 124.

Although the first segment is organized in a dual firewall configuration, the first segment can also be organized in a single firewall configuration, such as a three legged network model. The router 104 is communicably interposed between the WAN 102 and the firewall 106. The firewall 106 is communicably interposed between the router 104 and the network server 108. The network server 108 is communicably interposed between the firewall 106 and the firewall 110. For example, a demilitarized zone or a perimeter network can be formed, where the network server 108 is positioned therein. The firewall 110 is communicably interposed between the application server 112 and the network server 108. The firewall 110 is communicably interposed between the LAN 116 and the network server 108. The application server 112 is communicably interposed between the firewall 110 and the database server 114. The LAN 116 is communicably coupled to the firewall 110, the workstation 118, the administrator terminal 120, and the multifunction device 122. Note that communicative interpositioning or communicative coupling can be direct or indirect, whether wired or wireless. For example, the network server 108, the application server 112, and the database server 112 can be contained in a single data center or distributed among a plurality of data centers in any permutational/combinatory manner.

The router 104 forwards data packets from the WAN 102 to the firewalls 106 and vice versa. Each of the firewalls 106, 110 is a network security system, whether hardware and/or software, which monitors and controls incoming and outgoing network traffic based on a set of security rules. Each of the firewalls 106, 110 can be a network firewall or a host-based firewall. Each of the firewalls 106, 110 can be identical or different from each other in structure or operation.

The network server 108 serves content, such as a network page, a data stream, or a data feed. For example, the network server 108 can serve content to the application server 112 in response receiving a corresponding request. For example, the network server 108 can push to or pull content from the application server 112. The network server 108 can serve content, such as a network page, such as via pushing or pulling, to the workstation 118, the administrator terminal 120, and the multifunction device 122 over the LAN 116 in response receiving a corresponding request. Such service can be via a protocol, such as via HTTP or a hypertext transfer protocol secure (HTTPS). For example, the network page can be file-based and can be static or dynamic. For example, the network page can be dynamically generated and can be markup language based, such as via a Hypertext Transfer Markup Language (HTML). For example, the network server 108 can comprises a web server, such as Apache, NGINX, Microsoft® Internet Information Server (IIS), Novell's NetWare server, Google Web Server (GWS), or IBM Domino server. For example, the network server 108 can be programmed to be a high-performance HTTP server and a reverse proxy, as well as an IMAP/Post Office Protocol 3 (POP3) proxy server. For example, the network server 108 can minimize or avoid reliance on threads to handle requests, and instead use a much more scalable event-driven (asynchronous) architecture, which uses small and predictable amounts of memory under load, while being scalable from a virtual private server (VPS) to a server cluster.

The application server 112 hosts a software application and a set of business logic for the software application. Therefore, as instructed by the software application, the application server 112 can communicably interface with the network server 108 through the firewall 110 and the database server 114. For example, the application server 112 can act as a middle-tier server, with the network server 108 acting as front-tier server, and the database server 114 acting as a back-end server. For example, the application server 112 can comprise an IBM WebSphere application server or a SAP Web application server. In some embodiments, where the firewall 110 is lacking, then the application server 112 can still communicably interface with the network server 108, which may be directly.

The application server 112 can comprise a plurality of independent cores, such as a multicore processor comprising a computing component with two or more independent processing units, which are the units that read and execute program instructions, such as via multiprocessing or multithreading. The instructions are processing instructions, such as add, move data, or branch, but the cores can run multiple instructions concurrently, thereby increasing an overall operational speed for the software application, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably, such as for data security or data integrity. For example, a data structure can be accessed, such as read or written, via at least two cores concurrently, where each of the cores concurrently processes a distinct data structure record or a distinct set of data such that at least two data structure records or at least two sets of the data are processed concurrently, without locking the data structure between such cores. However, note that data locking is possible. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as very long instruction word (VLIW), superscalar, vector, or multithreading. In some embodiments, whether additionally or alternatively, in whole or in part, at least one of the network server 108, the database server 114, the workstation 118, the terminal 120, or the client 138 can comprise a plurality of independent cores, such as a multicore processor comprising a computing component with two or more independent processing units, which are the units that read and execute program instructions, such as via multiprocessing or multithreading, as disclosed herein. Such configurations may enable parallel processing of relevant information, as disclosed herein, such as when used via many users for various tasks disclosed herein and thereby efficiently increase system computational speed. For example, when processing hundreds of concurrent connections, then such parallel processing architecture enables handling these connections by a small number of multiplexing processing, such as via one process per core.

The database server 114 hosts a database and a database management system (DBMS), such as an Oracle database, a MS-SQL database, an MS Access database, a Filemaker database, a DB2 database, NoSQL database, or others. The DBMS manages the database. The application hosted on the application server 112 can communicably interface with the DBMS in order to request various database operations, as disclosed herein, such as creating records, modifying records, retrieving records, searching records, identifying records, deleting records, sorting records, or others, in whole or in part. For example, some of various database input (I)/output (O) operations include reading, writing, editing, deleting, updating, searching, selecting, merging, sorting, erasing, formatting, or others. The DBMS can implement record locking on the database, such as for data integrity purposes. In some embodiments, the DBMS can avoid record locking.

The database stores data, whether in a raw state, a formatted state, an organized stated, or any other accessible state, and allows access to such data, whether directly and/or indirectly. The database can be a single database or a plurality of databases, whether hosted on a single machine or a plurality of machines, whether in a single data center or distributed among a plurality of data centers. The database can comprise at least one of a relational database, a non-relational database, a post-relational database, an in-memory database, a hybrid database, an Extensible Markup Language (XML) database, a parallel database, a distributed database, a graph database, a mobile database, an operation database, a probabilistic database, a real-time database, a spatial database, a temporal database, an object oriented database, an unstructured data database, a terminology oriented database, or others.

The workstation 118 is programmed to run an application on an operating system (OS), such as Windows, Linux, Android, MacOS, and/or others. For example, the application can comprise a browser, a productivity application, such as a word processor or a spreadsheet, a mobile app, or others. The application is programmed to display a graphical user interface (GUI), as disclosed herein. The GUI is programmed to display an output and receive an input. The input may be from a user, such as a service provider employee or another computer/software application. However, note that the GUI can receive and display other information as well, as disclosed herein. The workstation 118 can be configured to interface with the multifunction device 122, such as to print a report from the application via the multifunction device 122, such as in color or grayscale, such as via the LAN 116. The workstation 118 can communicate the input to the application server 112 via the LAN 116 and the firewall 110 or even without the firewall 110. In response, the application server 112 can perform various data operations, as disclosed herein, such as to execute the software application and the set of business logic for the software application accordingly or request the DBMS to identify or modify various records in the database hosted on the database server 114.

The administrator terminal 120 is programmed to allow maintenance or troubleshooting of the first segment, such as the router 104, the firewall 106, the network server 108, the firewall 110, the application server 112, the database server 114, the LAN 116, the workstation 118, and the multifunction device 122. Such maintenance or troubleshooting can involve file settings, file versioning, data structure maintenance, software updates, debugging, access control, simulation, event logging, event monitoring, automation, or others. In some embodiments, the maintenance or the troubleshooting can involve the second segment or the client 136.

The multifunction device 122 can comprise a scanner, a fax, a printer, a network-based messaging interface, whether LAN or WAN based, such as email, or any other functionality, in whole or in part, in any combinatory manner. The multifunction device 122 can be used via the workstation 118, the administrator terminal 120, the application server 112, or other components of the first segment. The multifunction device 122 can host an optical character recognition (OCR) engine to perform an OCR process, such as offline, on a scan, a fax, an email, or other functionalities of the multifunction device 122. Alternatively or additionally, the OCR process can be performed remote to the multifunction device 122, where the multifunction device 122 sends a document or an image, whether as scanned, faxed, or emailed, to a remote computer and then receives the document or the image that has already been subject to the OCR process from the remote computer, whether the remote computer performs the OCR process or forward the document or the image to another machine to perform the OCR process.

The client 136 comprises a tablet computer. However, note that the client 136 can be any type of a computer, such as a desktop, a laptop, a phone, a vehicle, or any other suitable computer.

Note that any of the servers disclosed herein can be hardware-based and/or software-based. Each of the servers is and/or is hosted on, whether directly and/or indirectly, a server computer, whether stationary or mobile, such as a kiosk, a workstation, a vehicle, whether land, marine, or aerial, a desktop, a laptop, a tablet, a mobile phone, a mainframe, a supercomputer, a server farm, and so forth. The server computer can comprise another computer system and/or a cloud computing network. The server computer can run any type of an OS, such as MacOS, Windows, Android, Unix, Linux, and/or others. The server computer can include and/or be coupled to, whether directly and/or indirectly, an input device, such as a mouse, a keyboard, a touchscreen, a biometric reader, a clicker, a microphone, or any other suitable input device. The server computer can include and/or be coupled to, whether directly and/or indirectly, an output device, such as a display, a speaker, a printer, or any other suitable output device. In some embodiments, the input device and the output device can be embodied in one unit, such as a touch-enabled display, which can be haptic. Each of the servers can employ load-balancing technologies and/or failover technologies for operational efficiency, continuity, and/or redundancy. Each of the servers can be task-dedicated. At least two of the servers can be a single server.

Note that the clients disclosed herein can be hardware-based and/or software-based. Each of the clients is and/or is hosted on, whether directly and/or indirectly, a client computer, whether stationary or mobile, such as a terminal, a kiosk, a workstation, a vehicle, whether land, marine, or aerial, a desktop, a laptop, a tablet, a mobile phone, a mainframe, a supercomputer, a server farm, and so forth. The client computer can comprise another computer system and/or cloud computing network. The client computer can run any type of an OS, such as MacOS, Windows, Android, Unix, Linux, and/or others. The client computer can include and/or be coupled to an input device, such as a mouse, a keyboard, a camera, an accelerometer, a touchscreen, a biometric reader, a clicker, a microphone, or any other suitable input device. The client computer can include and/or be coupled to an output device, such as a display, a speaker, a joystick, a printer, or any other suitable output device. In some embodiments, the input device and the output device can be embodied in one unit, such as a touch-enabled display, which can be haptic.

In some embodiments, any strings/symbols disclosed herein can be in any human or machine language in any alphanumeric font or via any pictorial, symbolic, or sound representation, such as a string, an icon, a banner, an audio, a video, a vibration, or a photo. Also, note that if any strings/symbols/identifiers disclosed herein are improperly formatted, then the application server 112 may format into an appropriate format. For example, if the application server 112 receives a string/symbol in a first format, then the application server 112 can convert the string/symbol from the first format into a second format, such as for data structure or processor compatibility or computational efficiency. For the example, the first format can be in a first character-encoding scheme and the second format can be in a second character-encoding scheme. For example, the first format can an archive or zipped file and the second format can be un-archived or unzipped file.

In some embodiments, an input can be in a natural language form, such as in a sentence or sound or image, where such input can be subsequently processed via the application server 112 implementing a natural language processing algorithms, such as based on statistical model machine learning. For example, such algorithms can involve automatic summarization, co-reference resolution, discourse analysis, machine translation, morphological segmentation, named entity recognition (NER), native language identification, natural language generation, natural language understanding, OCR, part-of-speech tagging, parsing, question answering, relationship extraction, sentence breaking, sentiment analysis, speech recognition, speech segmentation, stemming, topic segmentation and recognition, word segmentation, word sense disambiguation, or others.

In one mode of operation, at least based on above, in response to a receipt, by the network server 108, which may be a reverse proxy server, over the WAN 102, of an input from an input field of a network page served to the client 124 over the WAN 102, a request, by the network server 108, is placed for a numeric value from the application server 112 based on the input. Further, based on the input, the application server 112 queries a plurality of databases, which may be remote to the first segment, and correspondingly receives a plurality of query results from the databases. Then, the application server 112 submits the query results to an application programming interface hosted on the application server 112 and responsively receives a feature vector from the application programming interface. Subsequently, the application server 112 submits the feature vector into a model running on an application of the application server 112 and dynamically retrieved based on the feature vector from a model record of an in-memory database hosted on the database server 114. In response, the application server 112 receives the numeric value from the model. Accordingly, the numeric value is sent to the network server 108, which dynamically updates the network page to the client 124 based on the numeric value.

Figure 2:
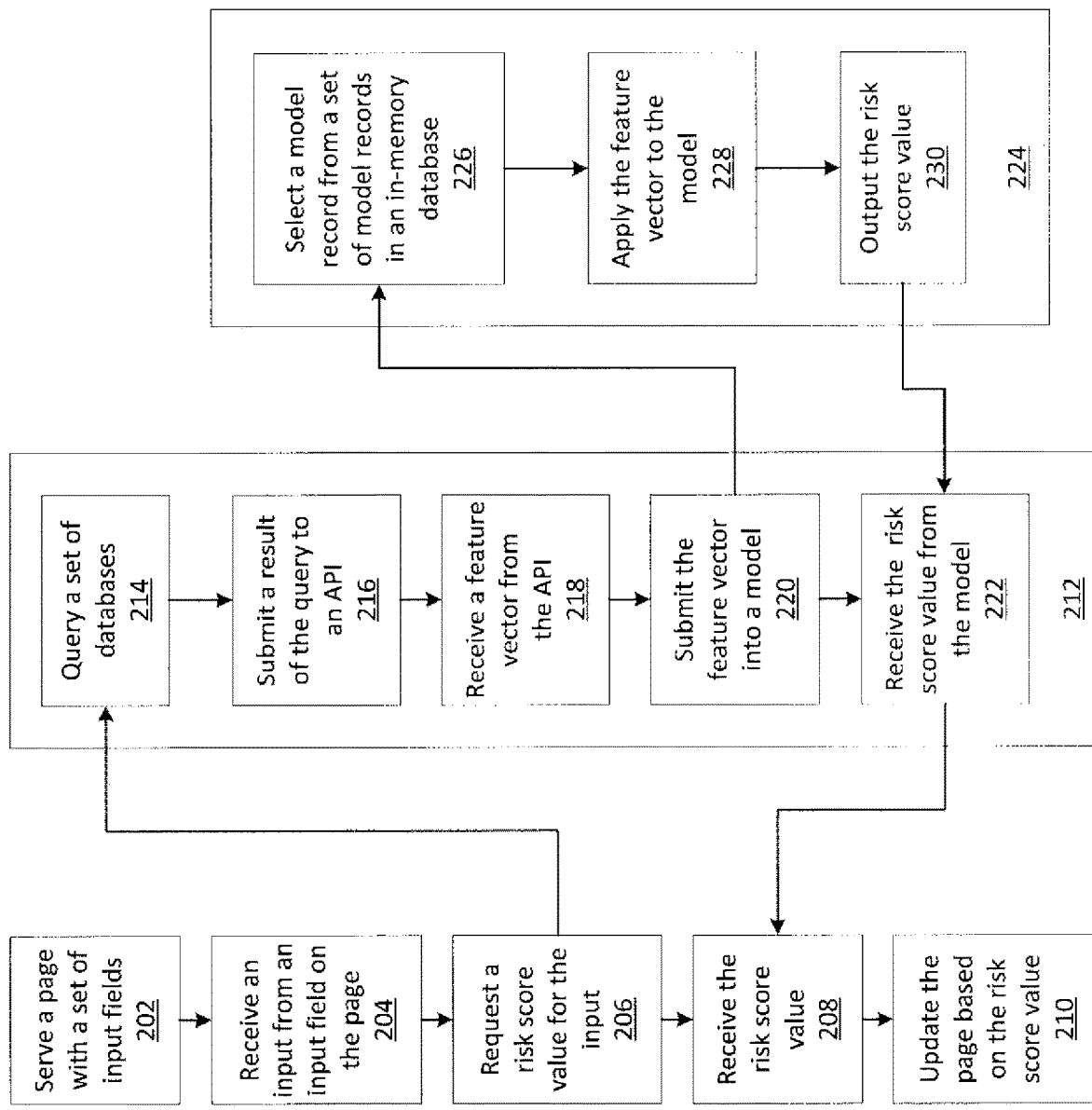
FIG. 2 shows an embodiment of a flowchart of a method employing the network topology according to this disclosure.

FIG. 2 shows an embodiment of a flowchart of a method employing the network topology according to this disclosure. A process 200 includes a plurality of blocks 202-230. The process 200 can be performed via the topology 100 of FIG. 1, in whole or in part.

In a block 202, the network server 108 serves a page with a set of input fields to the client 124 over the WAN 102. For example, the page can include a form for completion by a user of the client 124, where the form includes a plurality of graphical elements, such as text fields, buttons, sliders, checkboxes, dropdown menus, or others, for interaction with the user, and where the form is or will be associated with a profile corresponding to the user. For example, the form can intake user information for a provision of a service to the user. For example, the block 202 can be performed in response to the network server 108 receiving a request from the client 124 over the WAN 102, such as via another network page accessed via the client 124 or served by the network server 108 to the client 124, requesting for the page with the set of input fields.

In a block 204, the network server 108 receive an input from an input field on the page. For example, the input can include an alphabetic string, a numeric string, or a binary value, where the input is received as the input field is being populated or after being submitted in response to a user activation, such as pressing a button or activating a hyperlink on the page.

In a block 206, the network server 108 requests a risk score value from the application server 112. In response, the application server 112 performs a process 212 to obtain the risk score value. During the process 212, the application server 112 and the database server 114 perform a process 224 to determine the risk score value. Note that the risk score value is based on the input and associated with the profile corresponding for the user. The risk score value enables a determination whether the provision of the service to the user is feasible.

In some embodiments, the process 224 is performed during the process 212, which itself is performed during the process 200. Since process 200 is performed during an intake of the user information for the provision of the service to the user, the process 212 and the process 224 are performed during the process 200 and therefore can be performed in parallel or in real-time, as the input fields are being populated on the page on the client 124, which may include the form. Therefore, such processing minimizes computational repetition based on verification or validation of the input, while minimizing a delay in verification or validation of the input, as disclosed herein. For example, the process 200, including the process 212 and the process 224, can be performed under one minute, such as under 45 seconds, under 30 seconds, under 15 seconds, under 10 seconds, or under 5 seconds, such as starting from the block 206.

In a block 208, the network server 108 receives the risk score value from the application server 112.

In a block 210, the network server 108 dynamically updates the page to the client 124 over the WAN 102 based on the risk score value.

In a block 214, responsive to the block 206, the application server 112 queries a set of databases, over the WAN 102 via the network server 108, which are remote, such as a prescription database, a driver records database, a credit score database, or others external to the first segment, although positioning internal to the first segment is possible.

In a block 216, the application server 112 receives a plurality of results from the set of databases over the WAN 102 via the network server 108 and submits the results to an application programming interface (API) hosted on the application server 112. The results can include alphanumeric data, binary data, image data, audio data, or others.

In a block 218, the application server 112 receive a feature vector from the API based on the results. The feature vector is associated with the profile corresponding to the user.

In a block 220, the application server 112 submits the feature vector into a risk model pre-generated based on a set of dynamically updateable database records for a set of users excluding the user. The risk model is executed on the application server 112. For example, the risk model can include a mortality model based on the set of users.

In a block 222, the application server 112 receives the risk score value from the model responsive to the block 220. The block 208 is responsive to the block 222.

In a block 226, responsive to the block 220, the application server 112 communicably interfaces with the database server 114, where the database server 114 hosts a DBMS and an in-memory database managed via the DBMS. The in-memory database stores a set of model records, where each of the model records stores a field containing a model. Additionally or alternatively, the record is the model. Additionally or alternatively, a set of records define the model when the set of records is aggregated, such as via the DBMS or the application server 112, and then processed, such as via the DBMS or the application server 112, such that the model is created or formed thereby. Accordingly, the application server 226 selects a model record from the set of model records via the DBMS, retrieves the model therefrom for use in an application running on the application server 112, and inserts the model into the application for processing for use with the feature vector. Note that the model record may be selected via the application based on the application analyzing the feature vector and correspondingly determining, based on a content or structure of the feature vector, which model record of the set of model records contains the model suitable or appropriate for that feature vector. For example, such analysis can generate a set of parameters based on which the set of model records is searched to identify a suitable or appropriate model, if any.

In a block 228, responsive to the block 226, the application server 112 applies the feature vector to the model in the application running on the application server 112. The model analyzes the feature vector.

In a block 230, the application server 112 receives the risk score value from the application running on the application server 112. The block 222 is responsive to the block 230.

For example, the process 200 can be implemented via generating a mortality database, such as with about a set of one million user records, which can be hosted via the database server 112. Each of the user records contains a set of discrete observation values about a particular user, such as what a user risk profile looks like at a certain point in time. Such information can be obtained from a set of inputs received from a user, such as via the client 124 over the WAN 102, relating to a specific data point associated with the user, such as a question answered by the user via the client 124, a service requested by the user via the client 124, a result of a panel of biochemical lab tests based on a fluid obtained directly from the user, a motor vehicle record, and others. Likewise, each of the user records contains a survival information, such as numerical data, which varies through time until a death event is recorded for that record. This set of user records is periodically updated, such as six months or three months, such as the survival information for each of the user records, and to an extent that new data points for the set of user records is received, then the set of user records is thereby supplemented.

Further, for a set of risk models stored in an in-memory database, such as via the database server 114, a risk model re-learning process is performed, such as via a combination of a cost regression (linear model appearing as a linear regression where inputs are data points, as disclosed herein, and are fit to a response variable that indicates a survival time and leaf squares are performed to quantify an error and a gradient is dispensed to optimize a function) and a random survival forest (a collection of decision trees, where a number of trees and a depth of trees is compared and optimized as data changes/updated, such as the set of user records), where a prediction that is output from the combination are input into another cost regression model to get a risk score value.

In the random survival forest, for each tree built, a variable is chosen from a subset of all variables available that maximizes a particular test statistic that summarizes survival between at least two groups. For example, if age is chosen as a splitting variable/threshold, then the age splits the set of user records set into two groups: one group that has an age less than that threshold and another one that has one greater. The age is chosen such that a survival characteristic of those two groups, i.e., a difference between the two groups, is maximized. This difference is quantified through a long-range statistics that is computed via comparing a Kaplan-Meier estimator between a survival curve of the two groups. Resultantly, as the set of user records is updated, a search is performed over all different combinations of the number of trees and the depth of trees to find a combination that maximizes a particular performance metric that is being used for quantification. Since each tree is going to maximize the metric, but an exact number of how many trees and the depth of trees is unknown, various iterations/traversals/searches are performed, i.e., a vast search (end by end metric or M by M) over all different combinations and you choose a combination that maximizes a particular performance statistic, such as concordance (a probability of ranking a pair of observations according to which one dies first or which, you know, which one is the most likely to die first). For example, for two records of the set of user records, one of two records corresponds to a deceased individual and the other of the two records corresponds to somebody that is still living, then the dead individual may be ranked first and the still living individual may be second. For example, same methodology may apply if, for two records of the set of user records, one individual or both individuals are deceased, then the two records are ranked according to which one deceased first. A fraction of time this is performed correctly corresponds to a concordance which can be interpreted as a probability of selected the first deceased correctly. Note that although a tree can be maximized for a particular metric, such as under ten thousand iterations in about twenty-four hours, in some implementations, multiple metrics can be maximized for.

Further, note that such processing cannot be manually performed because a risk variable may be manually processed in isolation (e.g. see how the risk variable varies with a risk, such as with a mortality risk, and then a point value is subjectively assigned to that based on how important that subjectively is and then move to a next point and so on). In contrast, various data structure methods, as disclosed herein, such as tree-based processing, a set of conditional probabilities or conditional risks is generated that is based on hundreds of interactions between different types of variables that are observed on a particular individual at a particular point in time, as memorialized in that user record.

Stated differently, historical risk assessment has looked at each variable independently of all others and assigned a score or a weighting to that variable. Then, the next variable is independently examined and so on until all relevant data points have been exhausted. Then, all the examined data points are summed up, i.e., points that are assigned for falling in different ranges for each one of those variables. In contrast, a holistic score is automatically generated that learns what kinds of dependencies or interactions exist amongst those variables and how they correlate with risk. For example, in context of risk assessment, traditionally, assuming one is trying to minimize points to correspond to lower risk, less points are assigned to user records/profiles for older users than for users of any age who have high cholesterol. However, in a mortality model as applied to a particular user record, as disclosed herein, upon examination of each of such variables, such as age and cholesterol, and upon examination of a distribution of having a low age and a high cholesterol, a risk value may be determined that for that particular user record the risk value may actually be low. Whereas, if one analyzes ages and cholesterol in isolation, then a higher risk value may be assigned (note that opposite or different kinds of dependencies amongst all various relevant variables can be possible).

For example, a data model, such as a mortality model or others, has learned various data trees and then generates an average across the data trees, where conditional dependencies can be built after running through a tree, scan values of variables, and then scan the values of user records that are flagged as alive or dead, and then runs through a subsequent tree; and then uses a new variable to split the prior tree into the sub-tree. Consequently, the user records can be grouped according to likelihood of mortality by a variable (e.g., age) because age is a good indicator of alive/dead in the data set, and then a next variable (e.g., cholesterol) can be used to identify when the next variable becomes a good indicator of breaking group into alive or dead; automatically breaks the group up using a log-rank test to determine whether there is a good indicator to break up groups; as preferred to choose a value that maximizes the log rank score for the survival score to do a split. This may be done via running through data set of clients or publicly available or proprietary databases (LexisNexis queries) for labeled data set.

Figure 3:
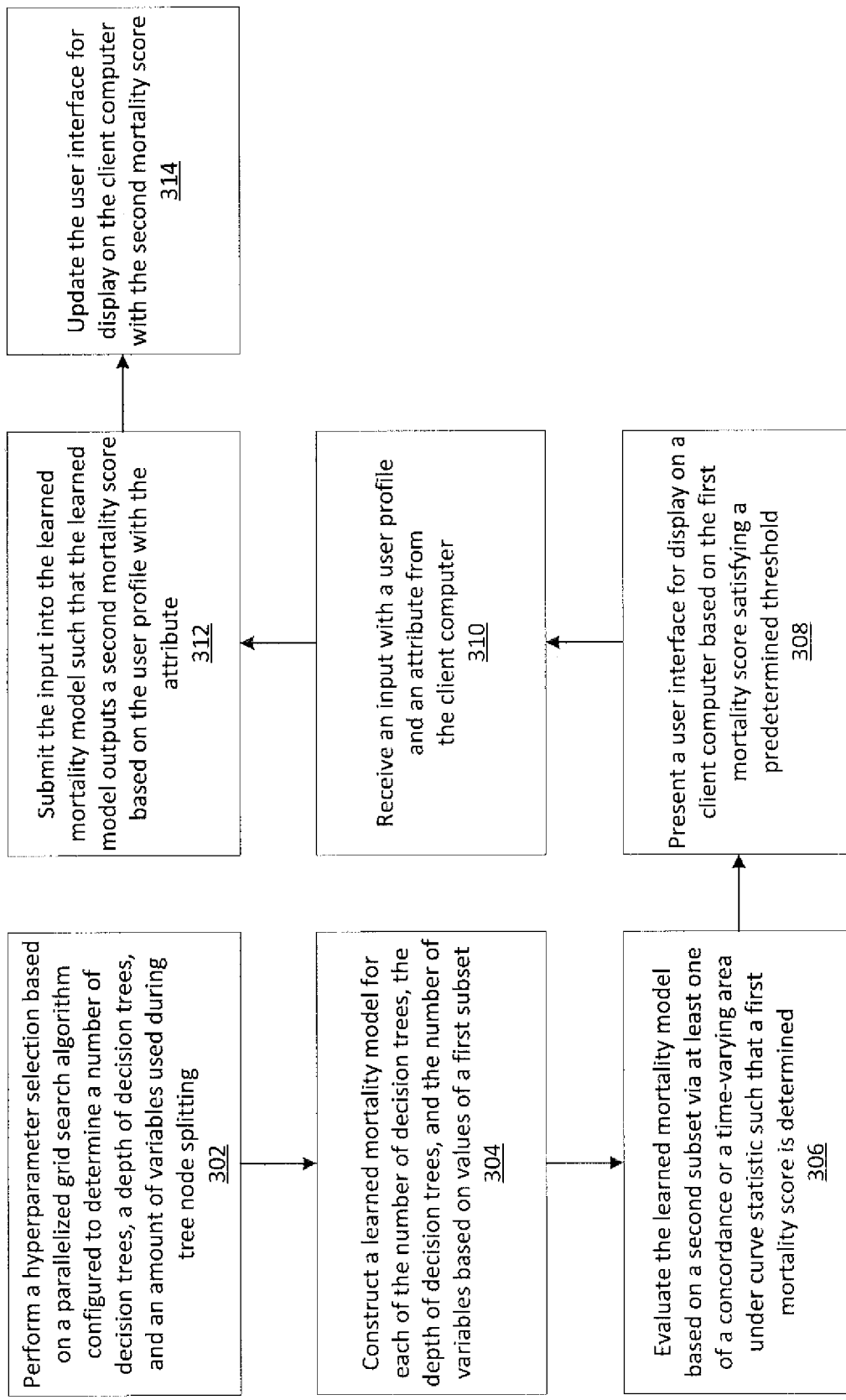
FIG. 3 shows an embodiment of a flowchart of mortality score determination according to this disclosure.

FIG. 3 shows an embodiment of a flowchart of mortality score determination according to this disclosure. A process 300 includes a plurality of blocks 302-314. The process 300 can be performed via the topology 100 of FIG. 1, in whole or in part.

In block 302, a processor, such as a multi-core processor within the application server 112, performs selection of a hyperparameter based on a parallelized grid search algorithm. For example, the hyperparameter includes a parameter whose value is set before a machine learning process begins, whereas a values of another parameter may be derived via training. The selection of the hyperparameter enables hyperparameter optimization or tuning in order to choose a set of optimal hyperparameters for a machine learning algorithm. For example, the hyperparameter optimization can find a tuple of hyperparameters that yields an optimal model which minimizes a predefined loss function on given independent data.

The parallelized grid search algorithm, which can include a parameter sweep, is configured to determine a number of decision trees, a depth of decision trees, and an amount of variables used during tree node splitting. For example, the parallelized grid search algorithm includes an exhaustive search through a manually specified subset of a hyperparameter space of a learning algorithm and can be guided by a performance metric, such as via cross-validation on a training set or evaluation on a held-out validation set. Since the hyperparameter parameter space of a machine learner may include real-valued or unbounded value spaces for certain parameters, manually set bounds and discretization may be used before initiating the parallelized grid search.

In block 304, the processor constructs a learned mortality model that encompasses each of the number of decision trees, the depth of decision trees, and the number of variables based on values of a first subset of a set of data. For example, the learned mortality model has learned various data trees and then generates an average across the data trees, where conditional dependencies can be built after running through a tree, scan values of variables, and then scan the values of user records that are flagged as alive or dead, and then runs through a subsequent tree; and then uses a new variable to split the prior tree into the sub-tree. Note that the learned mortality model can local to or remote from the processor, including in a distributed manner, such via being hosted on a plurality of network nodes.

In block 306, the processor evaluates the learned mortality model based on a second subset via at least one of a concordance or a time-varying area under curve statistic such that a first mortality score, which can be alphanumeric, is determined. The second subset is sourced from the set of data, yet exclusive of the first subset. For example, in the random survival forest, for each tree built, a variable is chosen from a subset of all variables available that maximizes a particular test statistic that summarizes survival between at least two groups. For example, if age is chosen as a splitting variable/threshold, then the age splits the set of user records set into two groups: one group that has an age less than that threshold and another one that has one greater. The age is chosen such that a survival characteristic of those two groups, i.e., a difference between the two groups, is maximized. This difference is quantified through a long-range statistics that is computed via comparing a Kaplan-Meier estimator between a survival curve of the two groups. Resultantly, as the set of user records is updated, a search is performed over all different combinations of the number of trees and the depth of trees to find a combination that maximizes a particular performance metric that is being used for quantification. Since each tree is going to maximize the metric, but an exact number of how many trees and the depth of trees is unknown, various iterations/traversals/searches are performed, i.e., a vast search (end by end metric or M by M) over all different combinations and you choose a combination that maximizes a particular performance statistic, such as concordance (a probability of ranking a pair of observations according to which one dies first or which, you know, which one is the most likely to die first). For example, for two records of the set of user records, one of two records corresponds to a deceased individual and the other of the two records corresponds to somebody that is still living, then the dead individual may be ranked first and the still living individual may be second. For example, same methodology may apply if, for two records of the set of user records, one individual or both individuals are deceased, then the two records are ranked according to which one deceased first. A fraction of time this is performed correctly corresponds to a concordance which can be interpreted as a probability of selected the first deceased correctly. Note that although a tree can be maximized for a particular metric, such as under ten thousand iterations in about twenty-four hours, in some implementations, multiple metrics can be maximized for.

In block 308, the processor present a user interface for display on a client computer based on the first mortality score satisfying a predetermined threshold. For example, the user interface can be presented via the network server 108 and the predetermined threshold, which can be alphanumeric, can be created or modified or deleted via the administrator terminal 120. As such, after the processor determines the first mortality score, the processor can compare the first mortality score against the predetermined threshold and then present or update the user interface based on the first mortality score satisfying the predetermined threshold. Note that the processor can take other actions, such as reading, writing, modifying, or deleting data to or from a predetermined data structure, such as an object, a file, an array, a list, a queue, a deck, a stack, a quad tree, or others, or submit a command to an input device, such as a microphone, a camera, or others, or an output device, such as a printer, a speaker, or others.

In block 310, the processor receives an input with a user profile and an attribute from the client computer. For example, the user profile with the attribute can be received as a data structure, such as an object, a file, an array, a list, a queue, a deck, a stack, a quad tree, or others, or as a set or sequence of raw values, which can be alphanumeric, or metadata or hypertext, such as Extensible Markup Language (XML), or data stream or others. The attribute can be alphanumeric. For example, the user profile with the attribute can include name string, residential address string, email address string, phone number string, health parameter values, social networking values, financial/credit values, or others.

In block 312, the processor submits the input into the learned mortality model such that the learned model outputs a second mortality score based on the user profile with the attribute. For example, the processor can submit the input via starting or restarting the learned mortality model such that the learned mortality model is running and then inserting the input into the learned mortality model as the learned mortality model is running. Then, the learned mortality model can display the second mortality score via a user prompt or another output technique, such as via sound through speaker or others. The second mortality score can be alphanumeric, whether in same or different format as the first mortality score.

In block 314, the processor updates the user interface for display on the client computer with the second mortality score. For example, the processor can update the user interface, such as an existing field on a webpage or forming a new field on a web page, over the WAN 102 or the LAN 116. The update can occur via sending the second mortality score from the application server 112 to the client computer, such as the client 124 or the workstation 118 or the administrator terminal 120 or the multifunction device 122.

In one technique of implementing the process 200, a hyper-parameter selection is performed via the application server 112, where the application server 112 employs a parallelized grid search algorithm to select hyper-parameters, such as a tree type, a number of trees, a depth of trees, a number of variables used during splitting, and others. For each set of variables (trees, depth, variables), a mortality model is constructed using a random subset of a complete data set, such as a random subset of the user records. The learned model is then evaluated on the remaining set of data using concordance and a time-varying area under curve (AUC) statistic as an evaluation metric. This set of steps may be carried out on a multi-core machine, such as the application server 112. Since each set of variables are independent from one another, all sets can be evaluated simultaneously. This may be done using a cluster of cloud-based servers, such as the application server 112 and the database server 114.

Figure 4:
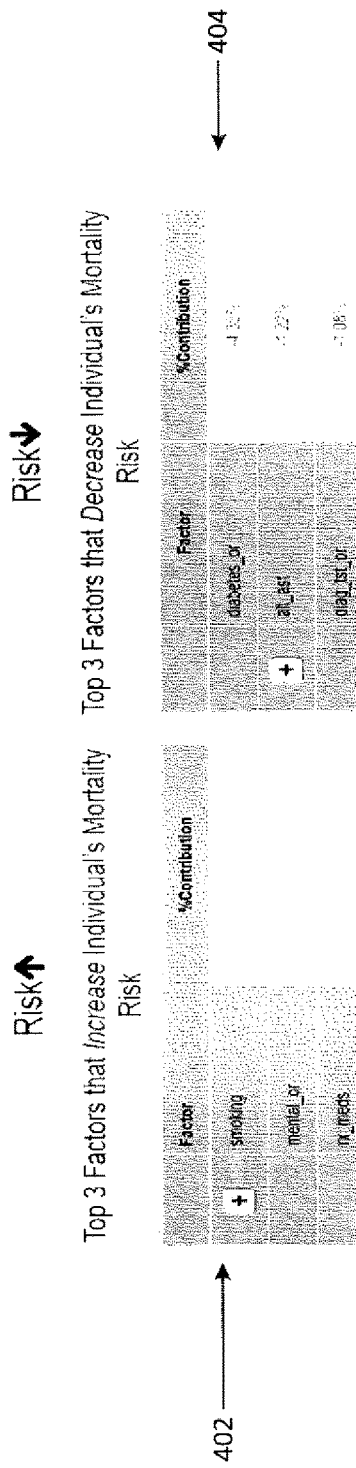
FIG. 4 shows an embodiment of a screenshot of a user interface depicting a plurality of tables indicative of a set of factors that increase or decrease a mortality risk according to this disclosure.

FIG. 4 shows an embodiment of a screenshot of a user interface depicting a plurality of tables indicative of a set of factors that increase or decrease a mortality risk according to this disclosure.

A user interface 400, such as a webpage, is shown based a set of computing operations, as explained herein. The user interface 400 depicts a first table 402 and a second table 404. The first table 402 contains a set of factors and a set of contribution values that correspond to an increase in a mortality risk. The second table 402 contains a set of factors and a set of contribution values that correspond to a decrease in a mortality risk. Note that in illustrative context of mortality risk, the mortality risk is learned from a set of health and behavioral variables extracted from the set of complete data, such as the set of user records. Some of such variables may be integrated into a mortality mode. For example, such variables include at least one of age, smoked in previous 5 years, blood disorder, medical diagnostic test in previous 5 years, gamma glutamyltransferase, aspartate transaminase (AST) and alanine transaminase (ALT) ratio, urine based nicotine metabolites, globulin, taking prescription drugs, blood urea nitrogen, creatinine, urine total protein, alkaline phosphatase, hemoglobin, systolic blood pressure, disability claim in previous 5 years, diastolic blood pressure, motor vehicle violations in past, estimated glomerular filtration rate, glucose, anti hcv (hepatitus c), vascular disorders, cholesterol, triglycerides, urine specific gravity, urine, respiratory disorders, cocaine metabolites, albumin globulin ratio, urine creatinine, high density lipoprotein, mental disorders, family history of diabetes, family history of vascular disorders, pulse at rest, urine glucose, diabetes, height, prostate specific antigen, weight, cancer disorder, serum glutamic oxaloacetic transaminase AST, body mass index, total bilirubin, family history of cancer, serum glutamic-pyruvic transaminase ALT, urine pc ratio, fructosamine, HIV positive, prescription drug history (derived from prescription drug databases), credit risk history, physical activity history (derived from sensor data), or examination history (derived from EMR and PHR data).

Various embodiments of this disclosure may be implemented in a data processing system suitable for storing and/or executing program code that includes at least one processor, including a multicore processor, coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of this disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, "R" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of this disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The flowchart and block diagrams in the Figures illustrate the architecture, functionality, and operation of possible implementations of systems, methods, and computer program products according to various embodiments of this disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction.

For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of this disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of this disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

What is claimed is:

1. A method comprising:
   generating, by a processor, a feature vector corresponding to one or more attributes of a user received via at least one of one or more input elements displayed on a computing device operated by the user or retrieved from one or more databases;
   determining, by the processor, a data structure type, from a plurality of data structure types indicating different methods of data organization, of the feature vector;
   searching, by the processor, a plurality of machine-learning models stored in a database, wherein each machine-learning model corresponds to a data structure type from the plurality of data structure types to identify a mortality machine-learning model that is suitable for processing the data structure type of the feature vector;
   executing, by the processor, the mortality machine-learning model to determine a likelihood of mortality for the user by applying the feature vector to the mortality machine-learning model, wherein the mortality machine-learning model is trained based on a machine-learning technique and a respective survival time in each of a set of historic user data records and their corresponding attributes;
   calculating, by the processor, contribution of at least one first factor analyzed by the mortality machine-learning model that contributed to increasing the likelihood of mortality;
   calculating, by the processor, contribution of at least one second factor analyzed by the mortality machine-learning model that contributed to decreasing the likelihood of mortality; and
   updating, by the processor, an electronic page based on the likelihood satisfying a threshold, wherein the updated page includes:
      an indication of the at least one first factor and its corresponding contribution to the likelihood of mortality, and at least one second factor and its corresponding contribution to the likelihood of mortality.

2. The method of claim 1, wherein the one or more attributes correspond to at least one of an age of the user, a blood disorder, a status of the user being a smoker, medical diagnostic tests, gamma glutamyltransferase, aspartate transaminase (AST) and alanine transaminase (ALT) ratio, urine based nicotine metabolites, globulin, prescription drugs, blood urea nitrogen, creatinine, urine total protein, alkaline phosphatase, hemoglobin, systolic blood pressure, disability claims, diastolic blood pressure, motor vehicle violations, estimated glomerular filtration rate, glucose, anti hcv (hepatitis c), vascular disorders, cholesterol, triglycerides, urine specific gravity, urine, respiratory disorders, cocaine metabolites, albumin globulin ratio, urine creatinine, high density lipoprotein, mental disorders, family history of diabetes, family history of vascular disorders, pulse at rest, urine glucose, diabetes, height, prostate specific antigen, weight, cancer disorder, serum glutamic oxaloacetic transaminase AST, body mass index, total bilirubin, family history of cancer, serum glutamic-pyruvic transaminase ALT, urine pc ratio, fructosamine, HIV positive, prescription drug history, credit risk history, physical activity history, or medical examination history.

3. The method of claim 1, wherein the mortality machine-learning model is a risk model pre-generated based on a set of dynamically updateable database records for a set of users excluding the user operating the computing device.

4. The method of claim 1, wherein the database is an in-memory database.

5. The method of claim 1, wherein the feature vector is generated via an application programming interface.

6. A computer system comprising:
a server in communication with a computing device, the server configured to:
generate a feature vector corresponding to one or more attributes of a user received via at least one of one or more input elements displayed on the computing device operated by the user or retrieved from one or more databases;
determine a data structure type, from a plurality of data structure types indicating different methods of data organization, of the feature vector;
search, based on the data structure type of the feature vector, a plurality of machine-learning models stored in a database, wherein each machine-learning model corresponds to a data structure type from the plurality of data structure types to identify a mortality machine-learning model that is suitable for processing the data structure type of the feature vector;
execute the mortality machine-learning model to determine a likelihood of mortality for the user by applying the feature vector to the mortality machine-learning model, wherein the mortality machine-learning model is trained based on a machine-learning technique and a respective survival time in each of a set of historic user data records and their corresponding attributes;
calculate contribution of at least one first factor analyzed by the mortality machine-learning model that contributed to increasing the likelihood of mortality;
calculate contribution of at least one second factor analyzed by the mortality machine-learning model that contributed to decreasing the likelihood of mortality; and
update an electronic page based on the likelihood satisfying a threshold, wherein the updated page includes:
an indication of the at least one first factor and its corresponding contribution to the likelihood of mortality, and at least one second factor and its corresponding contribution to the likelihood of mortality.

7. The computer system of claim 6, wherein the one or more attributes correspond to at least one of an age of the user, a blood disorder, a status of the user being a smoker, medical diagnostic tests, gamma glutamyltransferase, aspartate transaminase (AST) and alanine transaminase (ALT) ratio, urine based nicotine metabolites, globulin, prescription drugs, blood urea nitrogen, creatinine, urine total protein, alkaline phosphatase, hemoglobin, systolic blood pressure, disability claims, diastolic blood pressure, motor vehicle violations, estimated glomerular filtration rate, glucose, anti hcv (hepatitus c), vascular disorders, cholesterol, triglycerides, urine specific gravity, urine, respiratory disorders, cocaine metabolites, albumin globulin ratio, urine creatinine, high density lipoprotein, mental disorders, family history of diabetes, family history of vascular disorders, pulse at rest, urine glucose, diabetes, height, prostate specific antigen, weight, cancer disorder, serum glutamic oxaloacetic transaminase AST, body mass index, total bilirubin, family history of cancer, serum glutamic-pyruvic transaminase ALT, urine pc ratio, fructosamine, HIV positive, prescription drug history, credit risk history, physical activity history, or medical examination history.

8. The computer system of claim 6, wherein the mortality machine-learning model is a risk model pre-generated based on a set of dynamically updateable database records for a set of users excluding the user operating the computing device.

9. The computer system of claim 6, wherein the database is an in-memory database.

10. The computer system of claim 6, wherein the feature vector is generated via an application programming interface.

11. A system comprising:
a server comprising a processor and a non-transitory computer-readable medium containing instructions that when executed by the processor causes the processor to perform operations comprising:
generating, by a processor, a feature vector corresponding to one or more attributes of a user received via at least one of one or more input elements displayed on a computing device operated by the user or retrieved from one or more databases;
determining, by the processor, a data structure type, from a plurality of data structure types indicating different methods of data organization, of the feature vector;
searching, by the processor, a plurality of machine-learning models stored in a database, wherein each machine-learning model corresponds to a data structure type from the plurality of data structure types to identify a mortality machine-learning model that is suitable for processing the data structure type of the feature vector;
executing, by the processor, the mortality machine-learning model to determine a likelihood of mortality for the user by applying the feature vector to the mortality machine-learning model, wherein the mortality machine-learning model is trained based on a machine-learning technique and a respective survival time in each of a set of historic user data records and their corresponding attributes; and
calculating, by the processor, contribution of at least one first factor analyzed by the mortality machine-learning model that contributed to increasing the likelihood of mortality;
calculating, by the processor, contribution of at least one second factor analyzed by the mortality machine-learning model that contributed to decreasing the likelihood of mortality; and
updating, by the processor, an electronic page based on the likelihood satisfying a threshold, wherein the updated page includes:
an indication of the at least one first factor and its corresponding contribution to the likelihood of mortality, and at least one second factor and its corresponding contribution to the likelihood of mortality.

12. The system of claim 11, wherein the one or more attributes correspond to at least one of an age of the user, a blood disorder, a status of the user being a smoker, medical diagnostic tests, gamma glutamyltransferase, aspartate transaminase (AST) and alanine transaminase (ALT) ratio, urine based nicotine metabolites, globulin, prescription drugs, blood urea nitrogen, creatinine, urine total protein, alkaline phosphatase, hemoglobin, systolic blood pressure, disability claims, diastolic blood pressure, motor vehicle violations, estimated glomerular filtration rate, glucose, anti hcv (hepatitus c), vascular disorders, cholesterol, triglycerides, urine specific gravity, urine, respiratory disorders, cocaine metabolites, albumin globulin ratio, urine creatinine, high density lipoprotein, mental disorders, family history of diabetes, family history of vascular disorders, pulse at rest, urine glucose, diabetes, height, prostate specific antigen, weight, cancer disorder, serum glutamic oxaloacetic transaminase AST, body mass index, total bilirubin, family history of cancer, serum glutamic-pyruvic transaminase ALT, urine pc ratio, fructosamine, HIV positive, prescription drug history, credit risk history, physical activity history, or medical examination history.

13. The system of claim 11, wherein the mortality machine-learning model is selected based on the processor analyzing the feature vector.

* * * * *